(12) United States Patent
Cash

(10) Patent No.: US 11,808,487 B2
(45) Date of Patent: Nov. 7, 2023

(54) SOLAR CONCENTRATOR

(71) Applicant: International Electric Company Limited, Oxford (GB)

(72) Inventor: Ian Cash, Oxford (GB)

(73) Assignee: Cassiopeia Solar Limited, Derby (GB)

( * ) Notice: Subject to any disclaimer, the term of this patent is extended or adjusted under 35 U.S.C. 154(b) by 272 days.

(21) Appl. No.: 16/975,076

(22) PCT Filed: Feb. 21, 2019

(86) PCT No.: PCT/GB2019/050482
§ 371 (c)(1),
(2) Date: Aug. 21, 2020

(87) PCT Pub. No.: WO2019/162679
PCT Pub. Date: Aug. 29, 2019

(65) Prior Publication Data
US 2021/0088256 A1    Mar. 25, 2021

(30) Foreign Application Priority Data

Feb. 22, 2018   (GB) ..................................... 1802849
Aug. 7, 2018    (GB) ..................................... 1812844

(51) Int. Cl.
*F24S 23/79*     (2018.01)
*H02S 40/22*     (2014.01)
(Continued)

(52) U.S. Cl.
CPC .............. *F24S 23/79* (2018.05); *F24S 23/75* (2018.05); *G02B 5/10* (2013.01); *G02B 17/0621* (2013.01);
(Continued)

(58) Field of Classification Search
CPC ............ F24S 23/79; F24S 23/75; H02S 40/22; G02B 5/10
See application file for complete search history.

(56) References Cited

U.S. PATENT DOCUMENTS 5,540,216 A    7/1996  Rasmusson
6,691,701 B1*  2/2004  Roth ........................ F24S 50/00
                                                   126/685
(Continued)

FOREIGN PATENT DOCUMENTS

| CN | 101408668 | 4/2009 |
| EP | 0927857 | 9/2003 |
| WO | 2005088209 | 9/2005 |

OTHER PUBLICATIONS

Written Opinion of the International Searching Authority for International Application No. PCT/GB2019/050482 dated Jul. 5, 2019; 5 pages.

(Continued)

*Primary Examiner* — Tae-Sik Kang
(74) *Attorney, Agent, or Firm* — James J. Pingor

(57) ABSTRACT

A solar concentrator assembly (102) comprises a concave mirror (108) for collecting radiation that is collimated and has uniform distribution from a source and a convex mirror (110). The concave mirror (108) is configured to reflect the radiation to the convex mirror (110) and the convex mirror (110) is configured to reflect the radiation as a concentrated collimated beam in an emission direction that is angularly offset from the source. The concave mirror (108) and convex mirror (110) each have a focal length that varies along one axis such that the radiation collected by the concave mirror (108) is transmitted from the convex mirror (110) with uniform distribution.

12 Claims, 10 Drawing Sheets

(51) Int. Cl.
*F24S 23/75* (2018.01)
*G02B 5/10* (2006.01)
*G02B 17/06* (2006.01)
*G02B 27/14* (2006.01)

(52) U.S. Cl.
CPC ....... *G02B 17/0673* (2013.01); *G02B 27/141* (2013.01); *H02S 40/22* (2014.12)

(56) References Cited

U.S. PATENT DOCUMENTS

| | | | |
|---|---|---|---|
| 7,640,931 B2 * | 1/2010 | Tarabishi | F24S 40/55 |
| | | | 126/607 |
| 2007/0107769 A1 | 5/2007 | Cobb | |
| 2008/0087276 A1 | 4/2008 | Zhao | |
| 2009/0050324 A1 | 2/2009 | McNelly | |
| 2015/0378140 A1 | 12/2015 | Hutson | |

OTHER PUBLICATIONS

International Search Report for International Application No. PCT/GB2019/050482 dated Jul. 5, 2019; 3 pages.
Search Report for GB Application No. GB1802849.8 dated Aug. 3, 2018; 4 pages.

* cited by examiner

SOLAR CONCENTRATOR

This application is a National Stage application of International Application No. PCT/GB2019/050482, filed on Feb. 21, 2019 entitled "SOLAR CONCENTRATOR", which claims the benefit of GB Patent Application No. 1802849.8 entitled "SOLAR CONCENTRATOR" filed on Feb. 22, 2018 and GB Patent Application No. 1812844.7 entitled "SOLAR CONCENTRATOR" filed on Aug. 7, 2018, the entireties of which are incorporated by reference herein.

The present invention relates to a solar concentrator and more particularly but not necessarily exclusively to a solar concentrator for use in combination with a solar collector. The invention also relates to a combination of a solar concentrator and a solar collector and kits of parts for construction of a solar concentrator and a solar collector.

It is known to provide solar concentrator assemblies in order to concentrate radiation from a source before the radiation contacts a collector, such as an array of photovoltaic cells. These solar concentrators focus light such that the collector may be smaller and/or may operate more efficiently, whilst still using the same radiation source.

When used in a space-based application, it is important to keep overall mass as low as possible in order to minimise the costs of launch and deployment. If the concentrator is used in a space-based power-beaming application (either space-to-space or space-to-Earth, for example)—a technology that has been in the design stages for a significant amount of time—it is important that a solar collector is not only low mass, but also able to collect a large amount of radiation from the Sun whilst operating within its thermal constraints. Known designs of solar concentrator utilise a system of curved and/or planar reflectors in order to concentrate incident radiation onto a dual contiguous surface of photovoltaics, usually in a different rotating reference frame to the line joining the Sun.

A variation to this known art replaces the dual photovoltaic panels with secondary reflectors, with the dual beam concentrated onto a single photovoltaic surface forming one aspect of a "sandwich panel". The sandwich panel also comprises a power-conversion/distribution layer and a phased array layer for power-beaming.

Both the above solutions allow limited solar concentration due to the difficulty of removing and dissipating waste heat, this being particularly difficult in the near-vacuum of space, as this heat must be dissipated primarily by radiation.

A known third type of space-based solar collector breaks the contiguous photovoltaic surface into a stepped arrangement. Here, photovoltaic panels are arranged in different parallel planes interconnected by panels normal to the parallel planes. These "step" panels may be formed of a material that is able to radiate the waste heat. This method of collector requires a somewhat collimated and uniformly-concentrated beam in order that all layers receive similar illumination.

Whilst incident light on a solar concentrator is substantially collimated and evenly distributed—coming from a very distant source—it can be a challenge to provide a concentrated beam that shares these characteristics. For some collectors, such as those of the third type that do not have all of their collector elements in a single plane, a non-collimated and non-evenly distributed beam can further result in sub-optimal energy harvest.

The present invention intends to at least partially ameliorate the above issues.

According to a first aspect, there is provided a solar concentrator assembly comprising:
a concave mirror for collecting radiation that is collimated and has uniform distribution from a source; and
a convex mirror;
the concave mirror being configured to reflect said radiation to the convex mirror;
the convex mirror being configured to reflect said radiation as a concentrated collimated beam in an emission direction that is angularly offset from the source;
the concave mirror and convex mirror each having a focal length that varies along one axis such that the radiation collected by the concave mirror is transmitted from the convex mirror with uniform distribution.

By varying the focal lengths of the concave mirror and convex mirror along one of their axes, the resultant radiation beam after both reflections can be ensured to have uniform distribution and collimation. Of course, this is only the case when the source itself has uniform distribution and collimation. The skilled person will understand that varying the focal lengths of the concave mirror and convex mirror "along one of their axes" is the same as providing each with conical curvature, i.e. each mirror can be considered to be a part of a conical surface.

The term "collimated" is intended to include radiation that subtends an angle that is sufficiently small to make no material difference to the operation of the solar concentrator assembly. This is intended to include input subtended angles such as that of the Sun from Earth's orbit around it—0.53 degrees—and all such output subtended angles according to the particular instance of solar concentration factor and the laws of etendue conservation. There will be a similarly-related angular offset to the input and output collimated beams according to the system pointing accuracy towards the Sun. Such accuracy may be around 3 degrees or less.

The term "uniform distribution" is intended to mean that the flux density of the radiation is even across the collimated beam. However, this can only be the case where the radiation received from the source is also of a uniform distribution. Due to limitations on manufacture and assembly, including tolerances, the skilled person will realise that the term "uniform distribution" does not mean that the distribution must be exactly uniform.

Both the convex mirror and the concave mirror may be in the same rotational frame as that joining the Sun the Sun-line. They may be Sun-facing at all times when deployed in orbit.

The focal lengths of the concave mirror and the convex mirror may be continuously-variable along a focal line.

This reduces the chance of any change in concentration distribution of the radiation collected and emitted by the solar concentrator.

The emission direction may be orientated at approximately 90° from the source. This may be at 90° to the Sun-line and/or normal to the ecliptic plane.

The assembly may comprise two sets of convex and concave mirrors, arranged rotationally-symmetric and 180° about a direction of the source, for example about the Sun-line. This may stabilise the system and simplify Sun-pointing attitude control when in orbit around the Earth.

The one axis of the concave mirror and the one axis of the convex mirror may be co-planar.

The one axis of the concave mirror and the one axis of the convex mirror may be co-planar with the emission direction.

An area of the convex mirror that reflects radiation from the concave mirror may be smaller than an area of the concave mirror that reflects radiation to the convex mirror.

The radiation may include radiation of the visible spectrum.

The solar concentrator assembly may be optimised to minimise a total surface area of the concave mirror and the convex mirror.

The concave mirror and convex mirror may have missing quadrants. This allows the solar concentrator assembly to have a reduced mass whilst still being suitable for use with a solar collector with a helical stepped arrangement. With such a collector, two solar concentrator assemblies can be used to separately illuminate upper- and lower-facing portions of a photovoltaic array on the helically-stepped solar collector.

Thermal loading may also be limited by this arrangement.

The solar concentrator assembly may comprise a support structure that limits relative movement of the concave mirror and convex mirror.

The support structure may include a frame that interconnects the concave mirror and the convex mirror.

The convex mirror and concave mirror may have a continuously-variable curvature along one axis. They may be formable from flat sheet material.

The curvature of the concave mirror and the convex mirror may be configured to cause concentration of light only within a set of parallel planes containing the reflected rays from the concave mirror that are incident to the convex mirror, such planes being normal to all planes which contain both incident and reflected rays of the same (concave or convex) mirror. Such mirrors meeting these criteria have curvature only about one axis, but the degree of curvature may vary linearly along this axis, i.e. they may be formed from continuous unstretched planar thin-film material.

The concave mirror and concave mirror may each include an aperture. The apertures may be configured to correspond to parts of a solar collector that are not configured for light collection, for example where no photovoltaic cells are situated.

According to a second aspect, there is provided a solar collector assembly comprising:
 a solar concentrator according to the first aspect; and
 a solar collector;
 the convex mirror of the solar concentrator being configured to reflect the concentrated collimated beam towards the solar collector.

The solar collector assembly may further comprise an additional solar concentrator according to any preceding claim, the convex mirror of the additional solar concentrator being configured to reflect the concentrated collimated beam towards the solar collector.

The concave mirror and convex mirror may be transparent at wavelengths unsuitable for use by the solar collector. Unsuitable wavelengths may include those that are not convertible by photovoltaic panels of the solar collector. For example, making the concave and convex mirrors transparent to certain infrared wavelengths may reduce heat load at the solar collector.

The solar collector may be interposed between the solar concentrator and the additional solar concentrator.

The additional solar concentrator may be arranged as a 180° rotationally symmetric image of the solar concentrator. The rotational symmetry may be about the Sun-direction. Where the mirrors have missing quadrants, the additional solar concentrator may be arranged to be rotationally-symmetric with the solar concentrator.

The solar collector assembly may further comprise a power-beaming transmitter that is electrically-connected to the solar collector.

The solar collector may include a plurality of collector elements arranged in a non-planar configuration.

The plurality of collector elements may be arranged in a helical arrangement.

The concave mirror and convex mirror may have missing quadrants. This allows the solar concentrator assembly to have a reduced mass whilst still being suitable for use with a solar collector with a helical stepped arrangement. With such a collector, two solar concentrator assemblies can be used to separately illuminate upper- and lower-facing portions of a photovoltaic array on the helically-stepped solar collector. Thermal loading may also be limited by this arrangement.

According to a third aspect, there is provided a kit of parts for construction of a solar concentrator assembly in accordance with the first aspect.

According to a fourth aspect, there is provided a kit of parts for construction of a solar collector assembly in accordance with the second aspect.

Unless mutually-exclusive, features of all aspects may be used in combination with features of any other aspects and description of any particular feature in relation to any singular aspect is not intended to limit the use of this feature to solely this singular aspect.

A non-limiting embodiment will now be described with reference to the accompanying drawings, in which.

Figure 1:
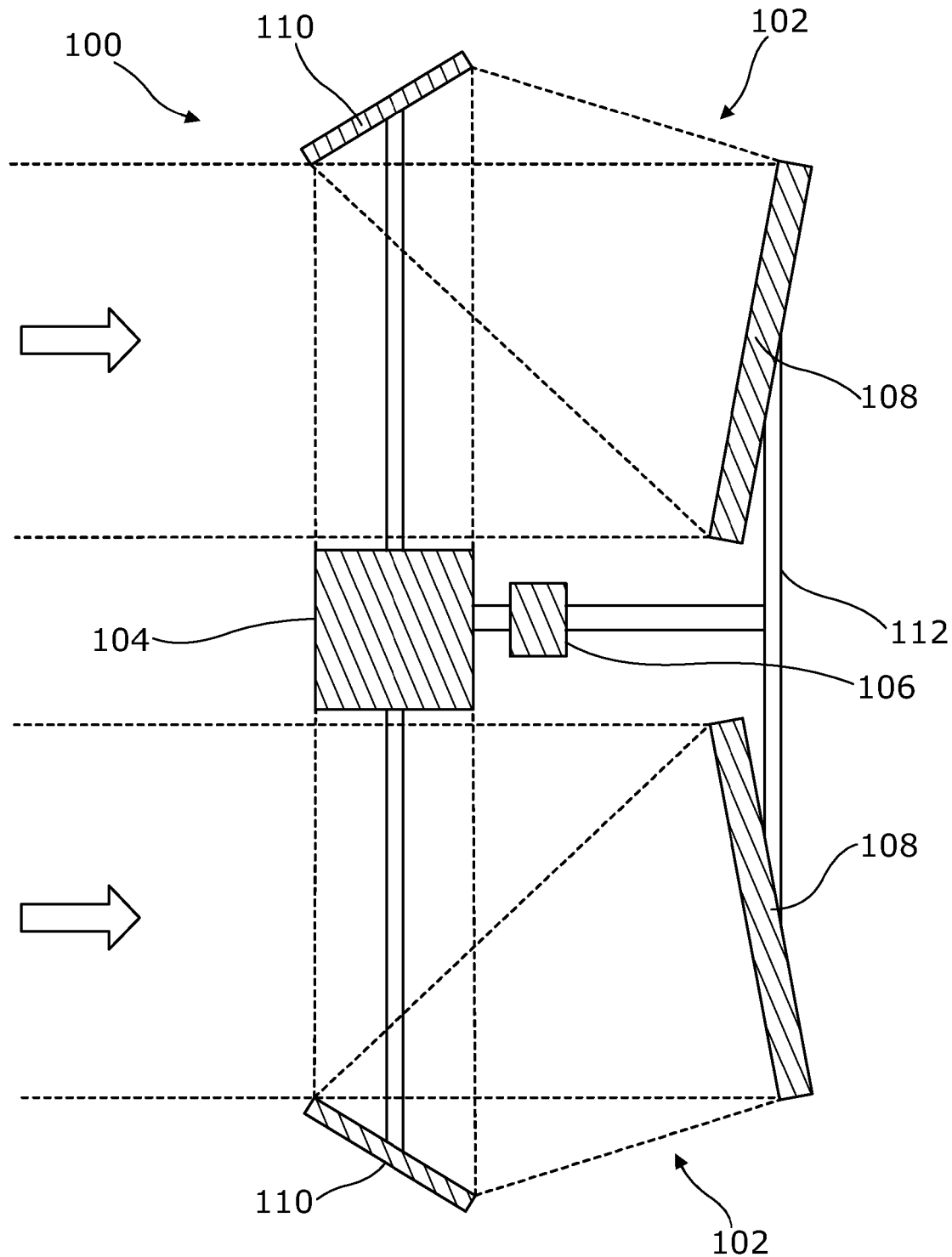
FIG. 1 is a simplified schematic view of a solar collector assembly in accordance with the second aspect.

Referring firstly to FIG. 1, there is shown a solar collector assembly 100. The solar collector assembly 100 includes two solar concentrator assemblies 102 arranged as mirror-images of each other, either side of a solar collector 104 that is interposed between the solar concentrator assemblies 100. The solar collector 104 can therefore collect the radiation and convert it to electrical energy using an array of collector elements (not shown) that take the form of photovoltaic cells. A power-beaming transmitter 106 is in electrical connection with the solar collector 104 and can transmit the electrical power to a remote receiver (not shown). The general operation of a solar collector assembly 100 and power-beaming transmitter 106 will be known to the person skilled in the art and therefore further description is omitted, for brevity. Each solar concentrator assembly 102 includes a concave mirror 108 and a convex mirror 110. For simplicity, the curvature of the mirrors 108, 110 is not shown in FIG. 1. Each concave mirror 108 is shaped and angled to direct substantially collimated radiation incident upon the concave mirror 108 towards the convex mirror 110. Due to the curvature of the concave mirror 108, the beam narrows in width from the concave mirror 108 to the convex mirror 110, as shown by the dotted lines.

The convex mirror 110 is shaped and angled so as to reflect the radiation incident upon it from the concave mirror 108 in an emission direction towards the solar collector 104, which collects radiation at an angle of 90° to that of the radiation incident upon the concave mirror 108. Due to the curvature of the convex mirror 110, the beam of radiation reflected from the convex mirror 110 regains its collimation such that it is again substantially collimated when falling incident upon the solar collector 104.

A support structure in the form of a frame 112 interconnects the convex mirror 110 and concave mirror 108 in order to maintain their relative positions and orientations. The solar collector 104 and power-beaming transmitter 106 are also connected to the frame 112, ensuring that the solar collector assembly 100 is dimensionally stable.

Figure 2:
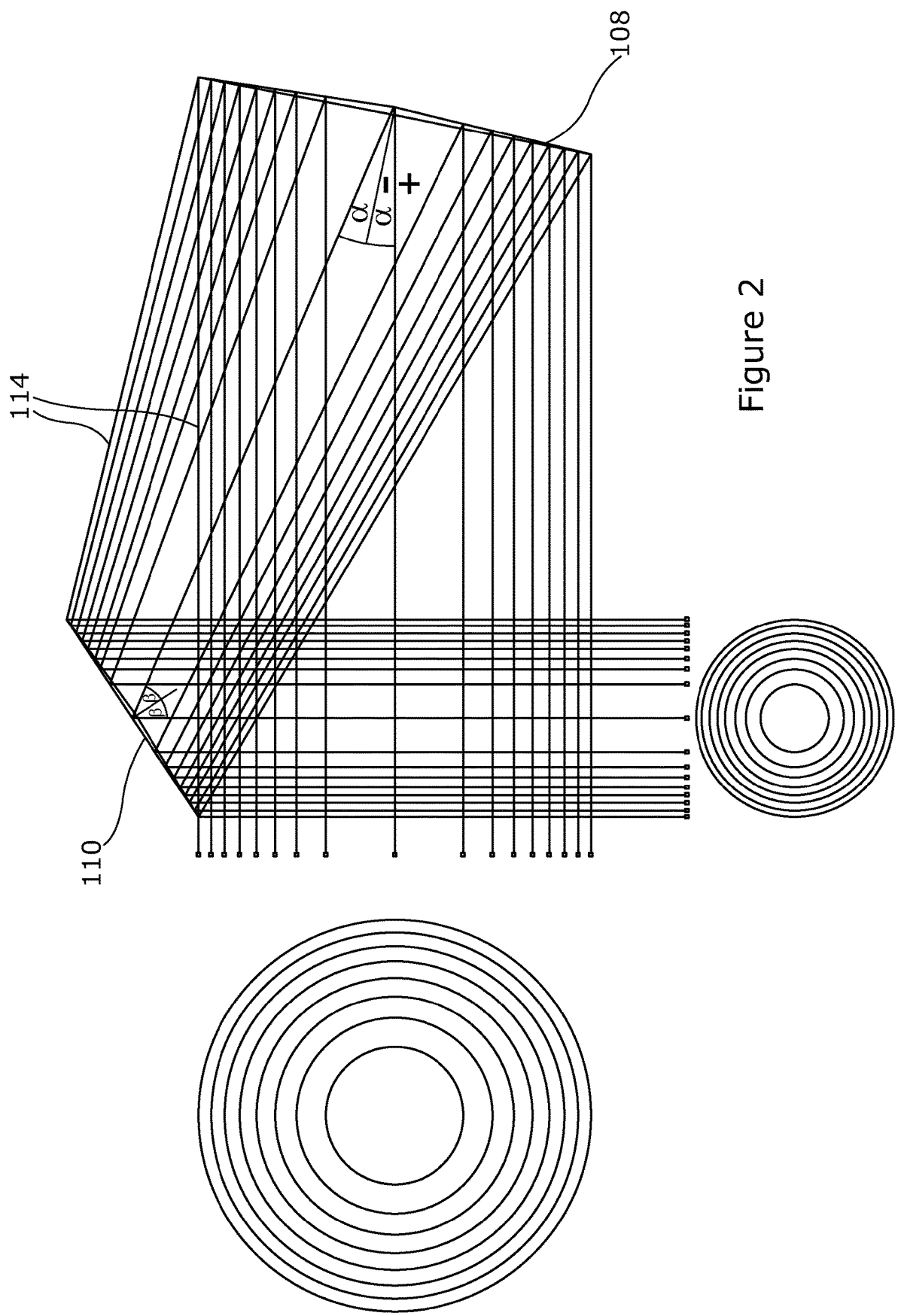
FIG. 2 is a diagrammatic view of a part of the solar collector assembly of FIG. 1, depicting the concentration distribution of the radiation and the subsequent concentration by the mirrors.

FIG. 2 shows the concave mirror 108 and convex mirror 110 of one of the solar concentrator assemblies 102. Along with this, ray lines 114 are shown, which show the direction of the incident radiation dependent on where the radiation falls on the mirrors 108, 110. Moreover, and as indicated by the inset images of concentric circles, each pair of ray lines 114 correspond to an equal area of radiation. As each area of the radiation from a distant source will have equal flux, the amount of radiation falling in each area is equal. The two inset images therefore also show how the distribution of radiation is conserved by the solar concentrator assembly 102.

The curvature of the mirrors 108, 110 required to give the characteristics as described can be obtained through modelling of the system using the following constraints:

collimated incident radiation and emission radiation;
uniform intensity across incident radiation and emission radiation;
rules of reflection; and
contiguous smooth mirror surfaces on the concave mirror 108 and convex mirror 110.

By providing these constraints and using Finite Element Analysis (FEA), it is possible to determine the curvature required, dependent on the angles of the mirrors 108, 110 and the required solar concentration factor C.

Figure 3:
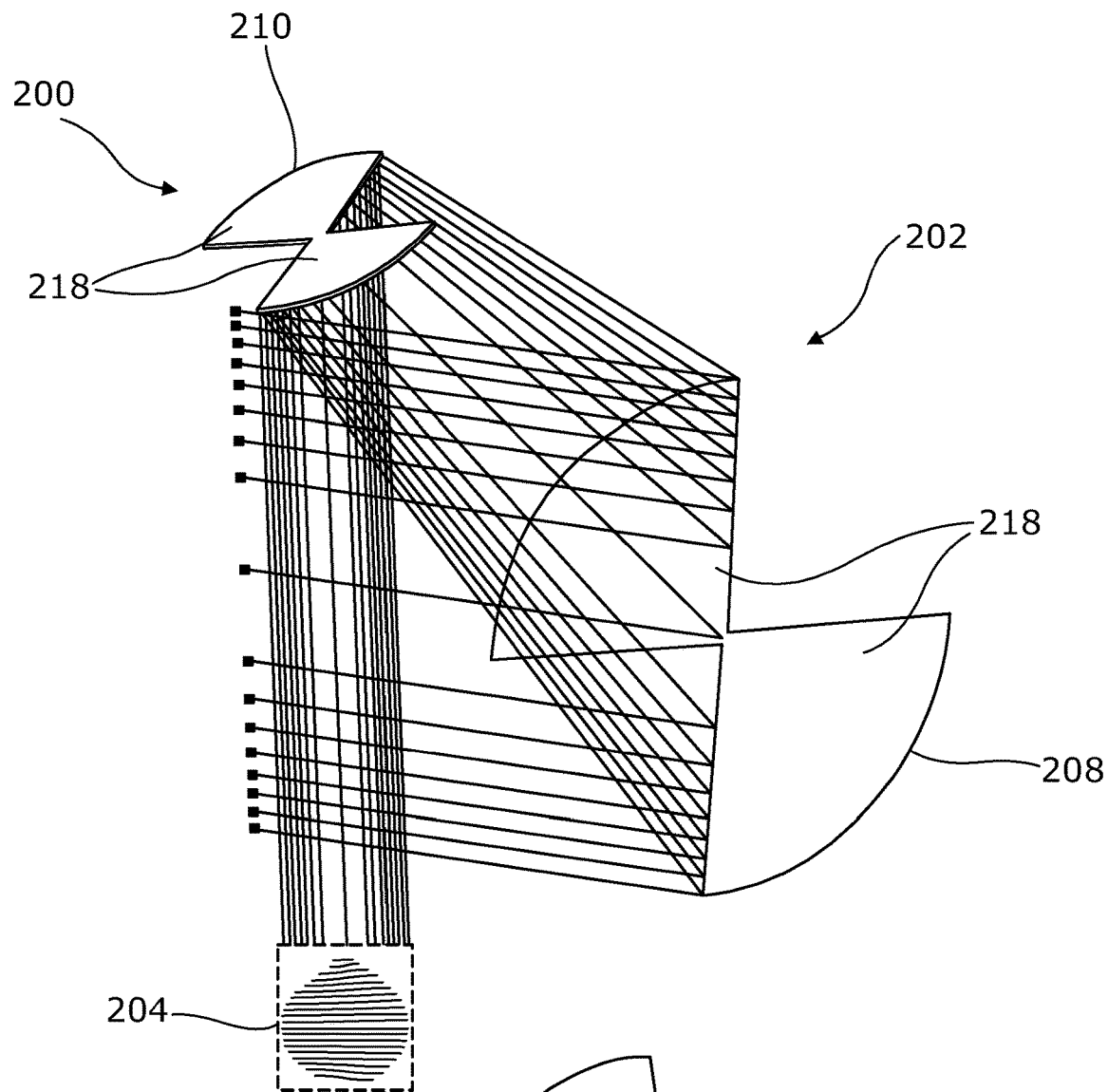
FIG. 3 is a perspective view of parts of a second embodiment of a solar collector assembly including a helical solar collector.
Figure 3:
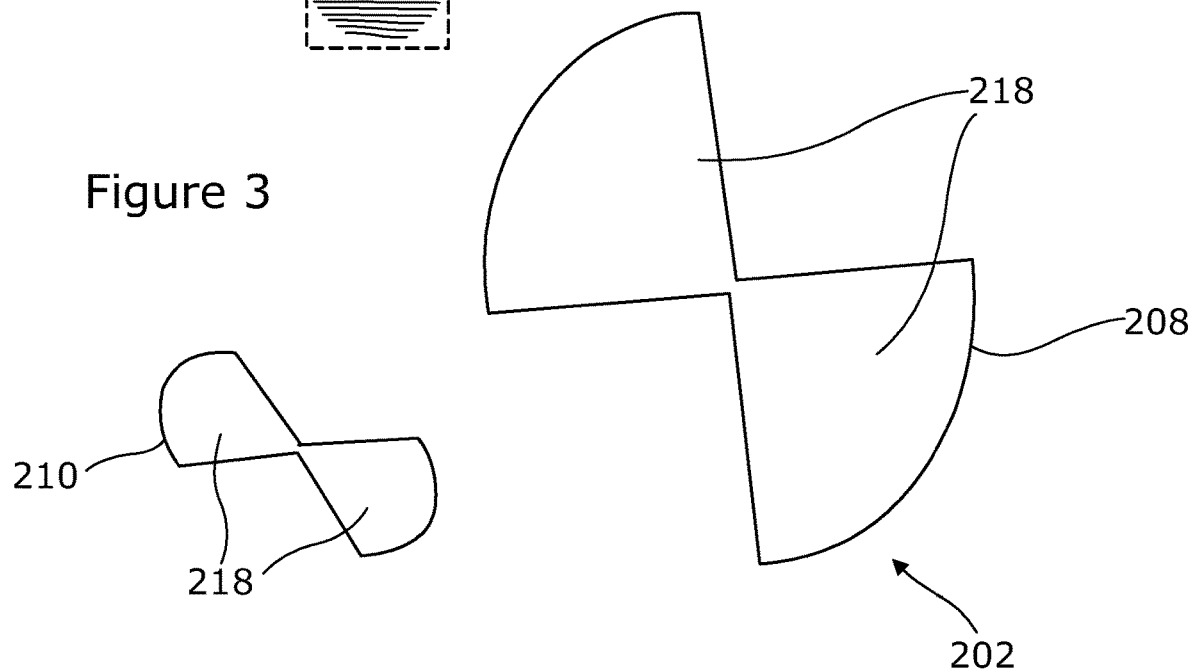

As can be seen, the centre of the concave mirror 108 of FIG. 3 is at an angle α to the incident radiation, with the convex mirror at 45° to the angle of the concave mirror 110 at an angle β. Whilst different mirror angles α, β can work with different mirror curvatures to create the effect of the present disclosure, the mirror angles α, β can be optimised to minimise the total combined area of the concave mirror 108 and convex mirror 110 in accordance with the required solar concentration factor C.

The solar concentration factor C is identical to the size difference of the mirrors 108, 110 required—including only the active parts of these mirrors 108, 110; the parts that reflect the incident radiation—to produce the solar concentration factor C. The area of the concave mirror 108 must increase by a factor of 1/cos α as it tilts away from the direction of the incident radiation. In order to produce an emission direction of 90° to the incident radiation, the concave mirror 110 must be at an angle β=α+45°. Therefore, for a concentration factor C, total mirror area A is proportional as follows:

$A \propto C/\cos \alpha + 1/\cos \beta$; where $\beta = \alpha + 45°$

Minimising area A gives the example values as follows:
C=2; α=−16.5°
C=3; α=−13.25°
C=4; α=−11.2°
C=5; α=−9.7°

The negative angles show that in order to minimise the area A of the mirrors 108, 110, the convex mirror 110 should be situated above the incident radiation, in the opposite direction to the emission direction. Whilst it would be possible to position the mirrors 108, 110 differently—for example, to position the convex mirror 110 below the incident radiation in the emission direction—this would result in the mirrors 108, 110 needing to have a larger overall area, increasing mass.

FIG. 2 shows an arrangement with a solar concentration factor C=4.

FIG. 3 shows another embodiment of a solar collector assembly 200, this time with a further optimisation based on the specific solar collector 204 being used. In this case, the solar collector 204 is a helical solar collector 204, shown in detail in FIG. 4. The helical solar collector 204 includes twenty rows of collector elements 216 in the form of solar cells.

Figure 4:
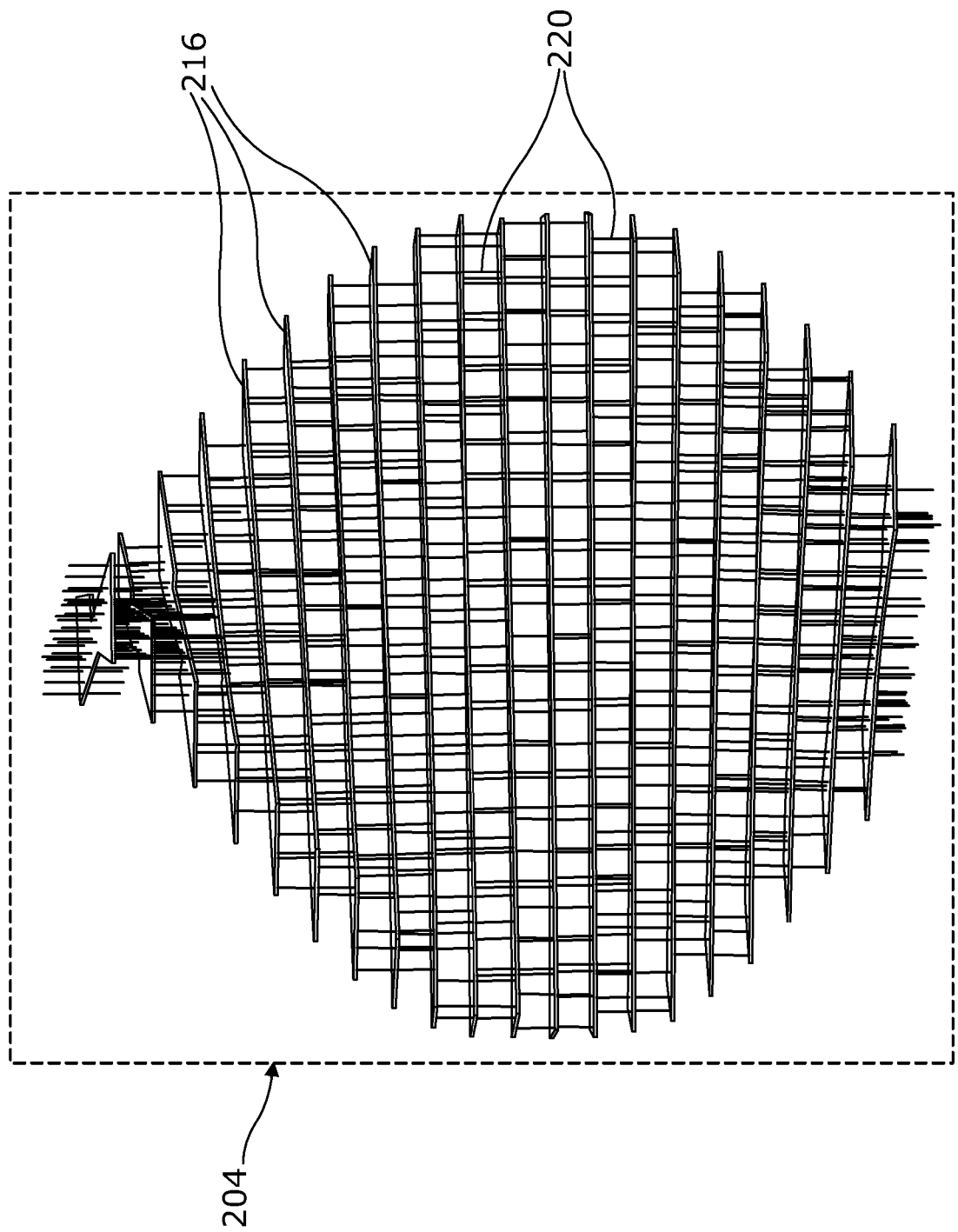
FIG. 4 is an enlarged view of the helical solar collector of FIG. 3.

Interposed between the collector elements 216 of the solar collector 204 of FIGS. 3 and 4 are transmitter elements 220 that form a phased-array. The transmitter elements 220 can transmit energy in any azimuth direction for power-beaming, removing the need for any rotational joints in the solar collector 204. This also removes the requirement of a separate power-beaming transmitter.

The helix twists through 180° between the top row and the bottom row. Because of this, the top half of the solar collector 204 can collect radiation from the upper solar concentrator assembly 202 and the bottom half of the solar collector 204 can collect radiation from the bottom solar concentrator assembly 202. However, this means that the active collector elements 216 for each solar concentrator assembly 202 are arranged only on two quadrants or sectors of a circle, when viewed from above or below.

The depicted arrangement is for drawing clarity. In practice, for microwave power-beaming, row spacing may be smaller than the microwave wavelength, e.g. 1 css than 100 mm, typically 14 mm. The overall diameter and height of the solar collector may be in the range of hundreds to thousands of metres, depending on the beaming distance and the particular wavelength of radiation used for power-beaming. Therefore, many thousands of rows may be used.

In order to further minimise the area and thus mass of the solar collector assembly 200, each mirror 208, 210 can therefore be limited to including only those quadrants or sectors that correspond to the available collector elements 216. Thus, as can be seen in FIG. 3, each of the mirrors 208, 210 includes two quadrants or sectors 218. These quadrants or sectors 218 are of the same profile as previously discussed, depending on the required angle and concentration factor, but have only half the area of the previous embodiment. The sectors 218 of the concave mirror 208 reflect radiation to the sectors 218 of the convex mirror 210 in order to provide a collimated concentrated beam in the emission direction, this beam simply having a cross-section that is composed of only two quadrants or sectors. Thus, the radiation is provided only where the respective collector elements 216 are positioned and no reflected radiation is unused, ensuring there is no wasted mass in the solar collector assembly 200.

The bottom solar concentrator assembly 202 acts in the same way as the top solar concentrator assembly 202, but only provides reflected radiation to the collector elements 216 in the bottom half of the solar collector 204.

An additional advantage of using two solar concentrator assemblies on opposing sides of the solar collector is that, in use, the effects of photon pressure and micro-gravity torque due to unequal distribution of mass about the orbital plane can be limited or completely removed. Furthermore, as collector elements are each only used on one side, the opposing side of each collector element can provide radiative cooling. This cooling could be further enhanced by the addition of fins, which could be arranged orthogonal to the line of the Sun in order to maximise cooling. Where power-beaming is provided, which is commonly at microwave frequencies, it may be beneficial to provide the cooling fins in a way that makes them transparent at microwave frequencies, for example by material selection.

Of course, where different solar collectors are used, with a different distribution of collector elements, the mirrors can be optimised to provide reflected light to only these collector elements. However, the overall theory behind the invention remains the same.

Figure 5:
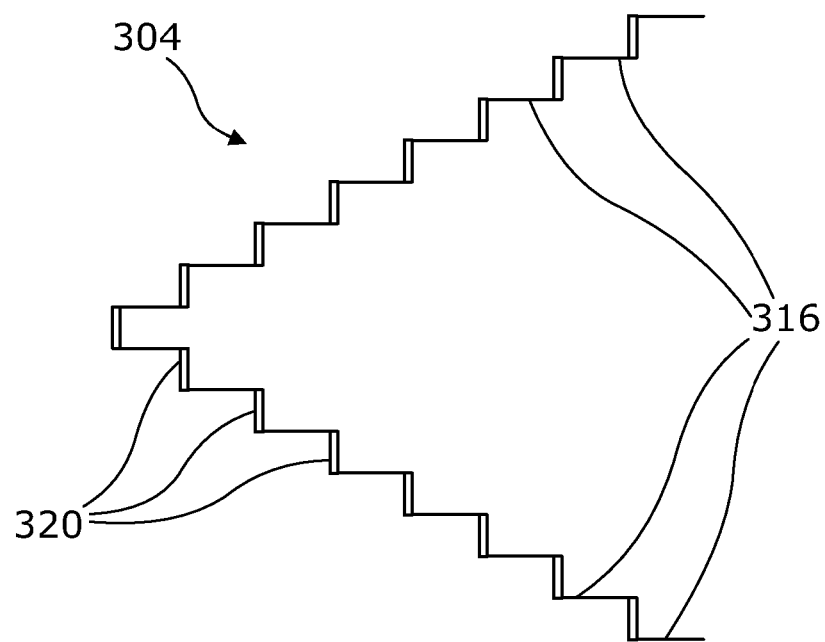
FIG. 5 depicts a side-on and top-down view of another solar collector usable with the first aspect.
Figure 5:
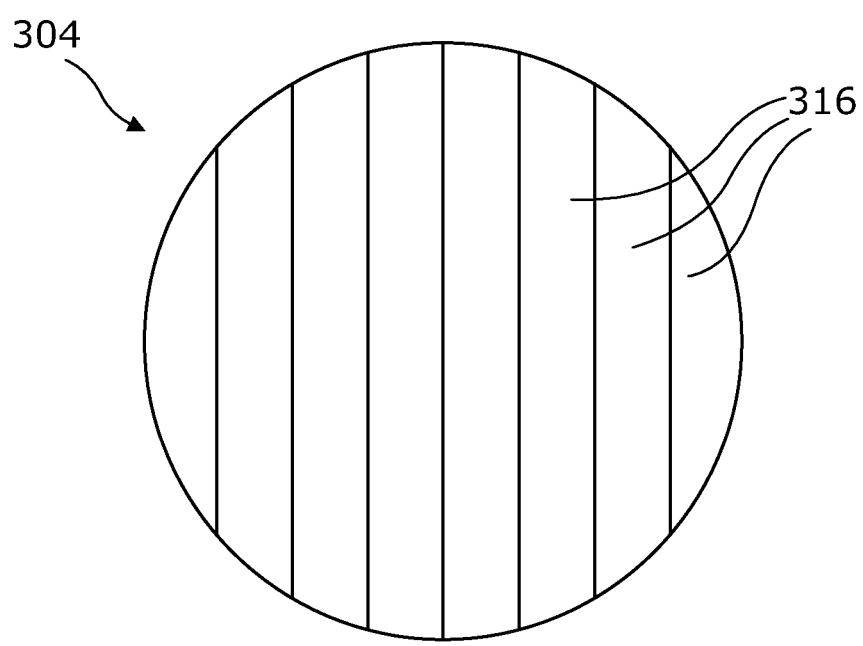

A different type of solar collector 304 is shown in FIG. 5 in both side-on and top-down views. The solar collector comprises eight collector elements pointing upwards and eight collector elements pointing downwards. The upward-facing collector elements form a fully-circular cross-section, unlike the solar collector of FIG. 4. Interconnecting the collector elements are transmitter elements. These are uni-directional and therefore require aiming towards a target for power-beaming. Methods of steering the solar collector will be known to the skilled person, for instance by use of a rotating joint. Alternatively, omni-directional transmitter elements could also be used.

Figure 6:
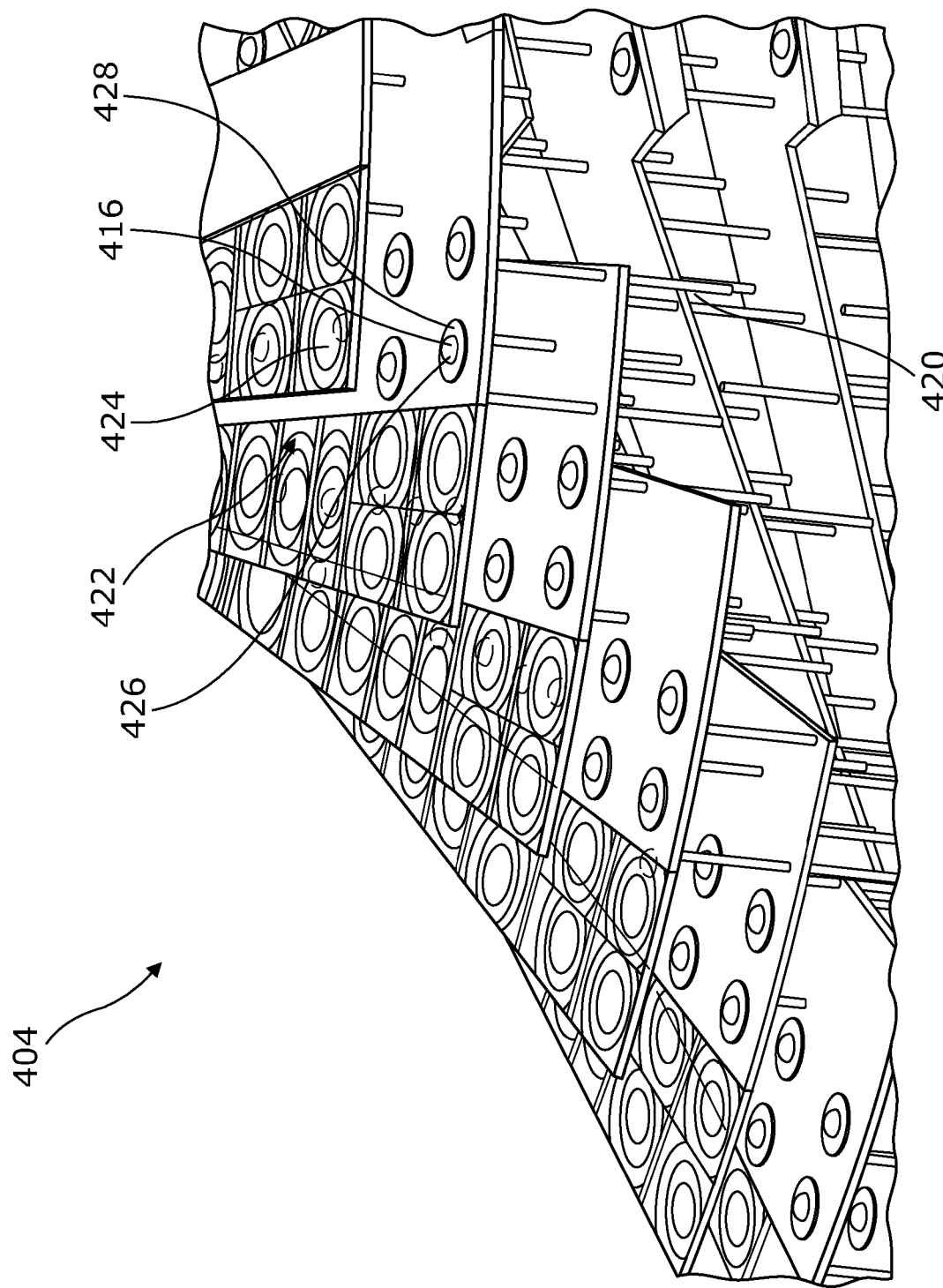
FIG. 6 is a partial view of a helical solar collector with additional concentrator elements.

In FIG. 6, a further helical solar collector 404 is partially shown. Here, concentrator elements 422 are used directly above the collector elements 416 in order to concentrate the light onto each photovoltaic cell of the collector elements 416. Concentrator elements 422 are shown as Fresnel-Kohler concentrators each comprising a Fresnel lens 424 and a Kohler lens 426 but may take any other form, the possibilities of which will be known to the skilled person. In the depicted embodiment, the Kohler lenses 426 and the collector element 416 in the form of a photovoltaic cell each sit on a heat-spreading disc 428, which is made of copper or another heat-spreading material. The Kohler lens also offers some radiation protection to the collector element 416. The transmitter elements 420 are the same as those used in the embodiment of FIG. 4.

Figure 7:
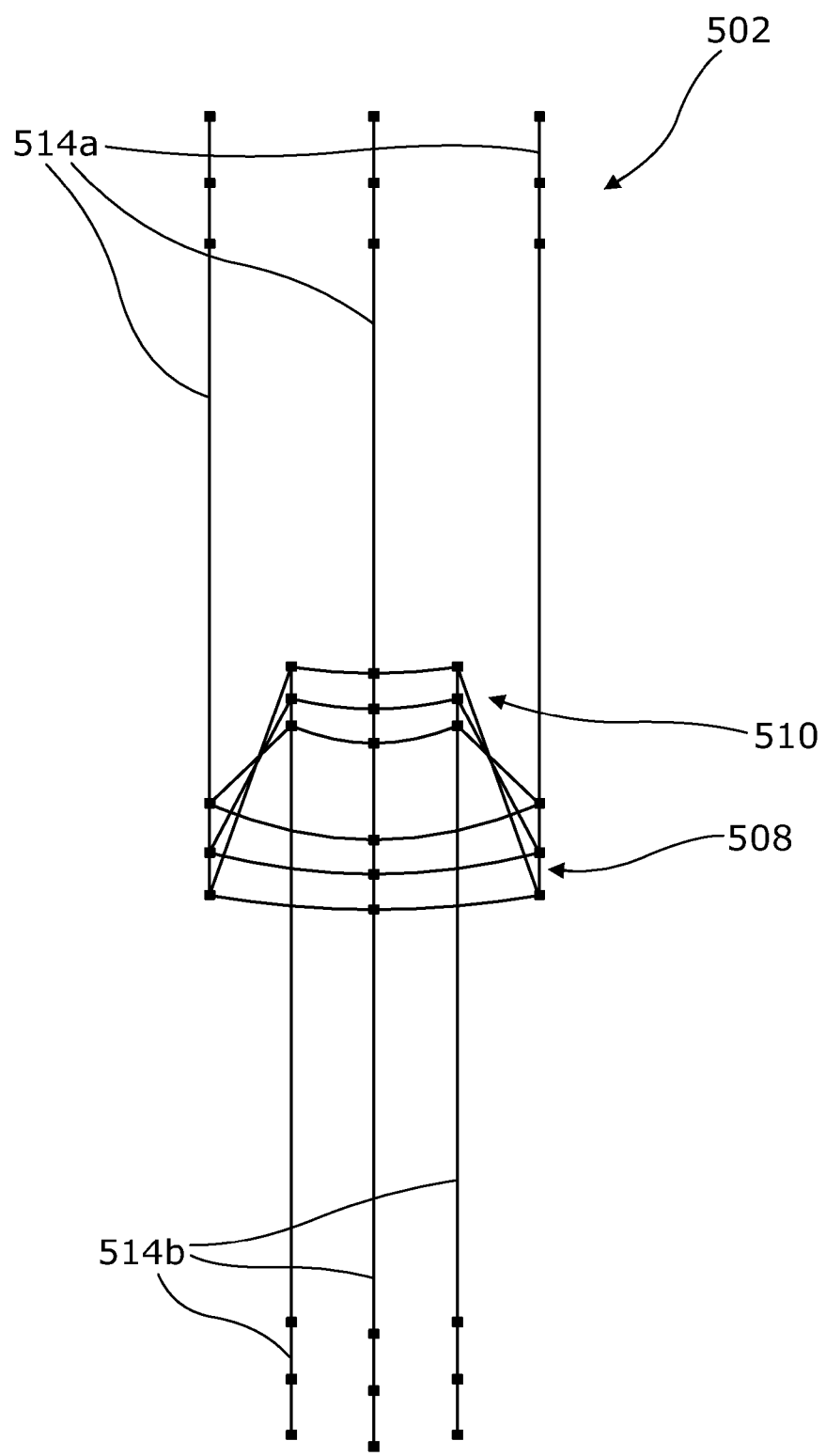
FIG. 7 is a first view of a third embodiment of a solar concentrator assembly in accordance with the first aspect, showing a set of overlaid parallel planes where concentration occurs between the mirrors.
Figure 8:
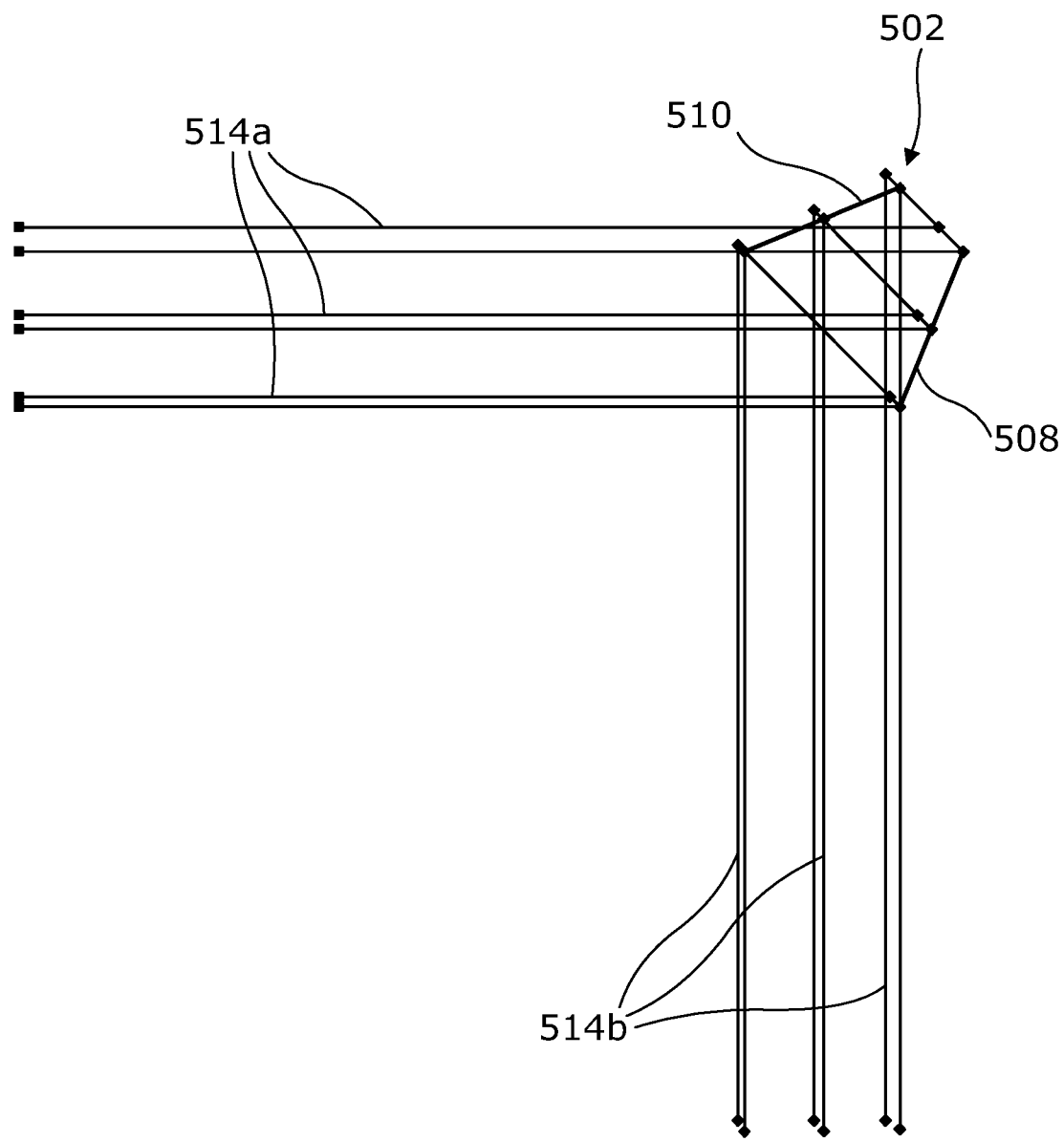
FIG. 8 is a second, orthogonal, view of the embodiment of FIG. 7, showing a set of overlaid parallel planes where no concentration occurs.
Figure 9:
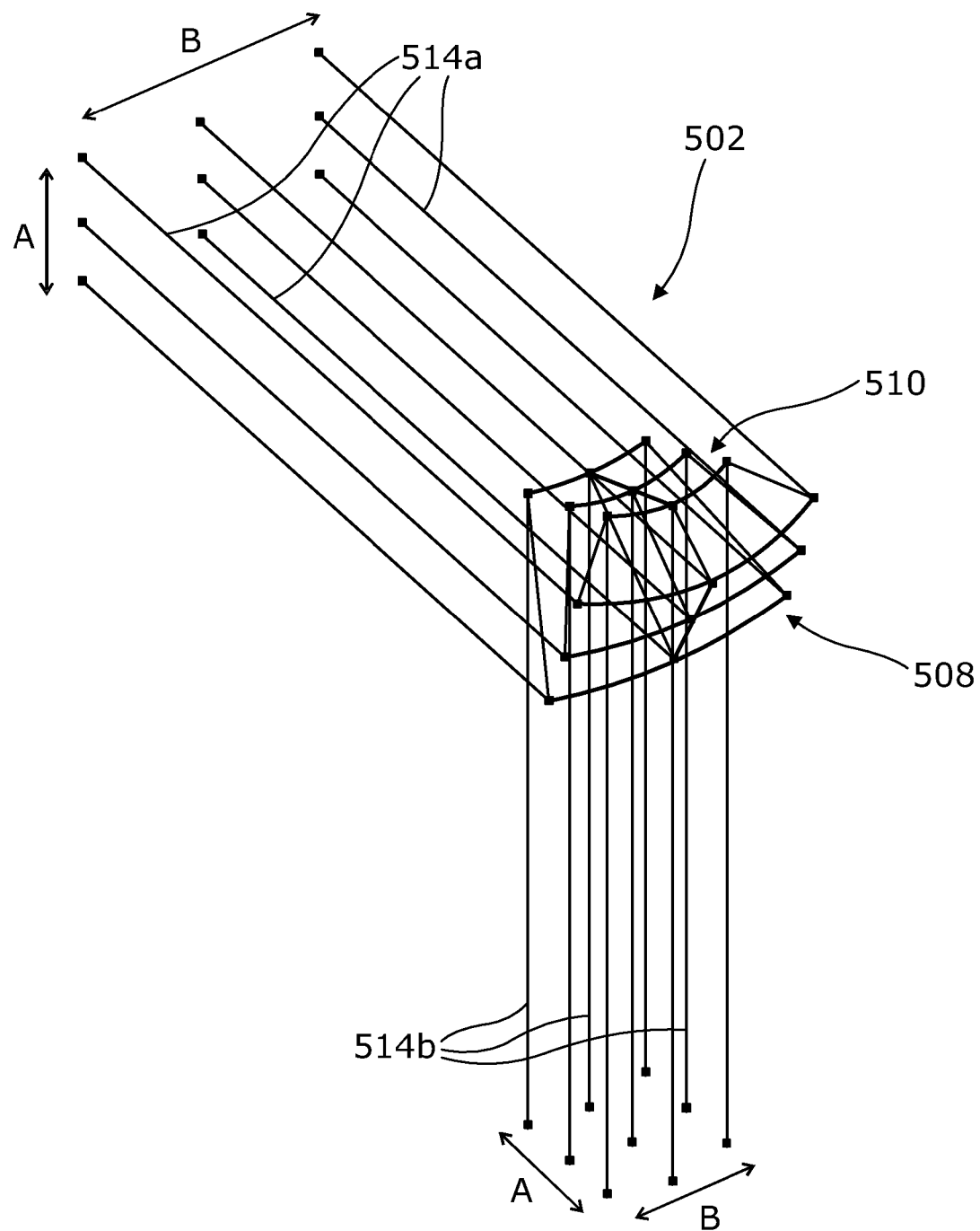
FIG. 9 is a perspective view of the embodiment of FIG. 7.

A further embodiment of a solar concentrator assembly 502 is shown in FIGS. 7 to 9. In contrast to the solar concentrator assemblies discussed previously, the solar concentrator assembly 502 includes a concave mirror 508 and a convex mirror 510 that concentrate radiation only along one set of parallel planes, with no concentration along other planes which are orthogonal to this set. This therefore allows the construction of the solar concentrator assembly 502 to be simplified in comparison with embodiments described earlier.

Whilst depicted in the simplified line drawings of FIGS. 7 to 9 as line drawings of three pairs of mirrors with differing curvature, in actuality the convex mirror 510 and concave mirror 508 are each a single mirror having continuously-variable curvature about one axis, i.e. the focal point of each of the mirrors 508, 510 varies continuously and linearly with movement along this axis such that there is a greater curvature at one end than the other. By providing the curvature about one axis, each of the two mirrors 508, 510 can be manufactured and assembled more simply than corresponding mirrors that have curvature about two axes. For example, large mirrors can be formed from large-area flat sheet material without stretch deformation.

As can be seen in FIG. 8, the concave mirror 508 and convex mirror 510 are each inclined at 22.5° with respect to the incoming and outgoing light rays 514a, 514b, respectively. It is this inclination that means that, in order to retain collimation of the incoming light 514a, the mirrors 508, 510 must have a greater curvature at points where they are closer together. The convex mirror 510 and concave mirror 508 are positioned so as to avoid self-shadowing, but are as close together as possible to minimise the overall volume of the assembly 502.

The depicted embodiment provides outgoing light rays 514b directed at 90° to the incoming light rays 514a. The curvature of the concave mirror 508 and convex mirror 510 cause concentration of these light rays between the mirrors along a set of parallel planes which are normal to the set of planes containing both rays 514a and 514b.

Although a 22.5° inclination of each mirror 508, 510 is provided in the depicted embodiment, it is also possible to provide different combinations of angles in order to provide the same result. Spacing of the concave mirror 508 and convex mirror 510 could also be varied from the minimum distance, depending on design parameters. Such variations will be computed by those skilled in the art without undue burden, and therefore further detailed discussion is omitted.

The simplified construction of this embodiment, where concentration is only along one set of parallel planes, means that skewed uniformity is no longer an issue and the mirrors 508, 510 can be formed more simply. The manner of concentration can be seen in FIG. 9, where it is clear that the spread of light rays in one direction A does not change—although the direction of A changes by 90° between the incoming light rays 514a and the outgoing light rays 514b—whereas the spread of light rays in a second direction B is compressed. In the depicted embodiment, the compression is by a factor of approximately two, although other concentration factors may be provided depending on the specific design of the concave mirror 508 and convex mirror 510.

Figure 10:
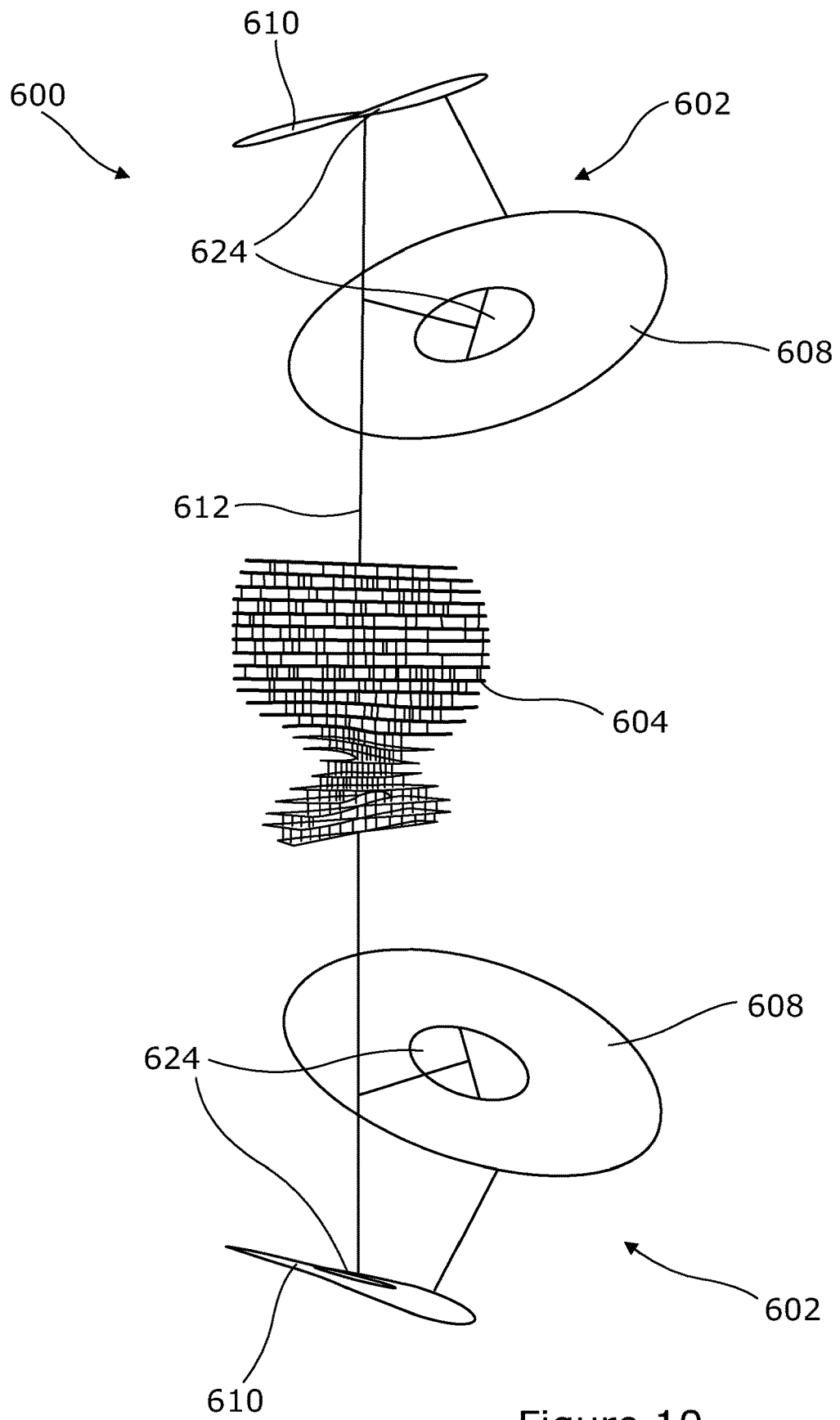
FIG. 10 is a perspective view of an embodiment of a solar collector assembly in accordance with the second aspect.

A slight refinement of the solar concentrator assembly 502 of FIGS. 7 to 9 is depicted in FIG. 10 as a solar concentrator assembly 602 in conjunction with a solar collector 604, forming a solar collector assembly 600. Here, the convex mirror 610 and concave mirror 608 remain configured to concentrate in only a single set of parallel planes, but the mirrors themselves are non-rectangular. Moreover, each of the mirrors 608, 610 includes an aperture 624. The solar collector 604 is substantially identical the solar collector 204.

Usefully, the apertures 624 provide anchoring points for the frame 612 that holds together the parts of the assembly 600. However, in a more practical sense, the apertures 624 are provided simply due to the fact that the depicted solar collector 604 does not include photovoltaic cells on the central 10% of its surface. By central 10%, it is meant the inner 10% of the area of the solar collector 604 when viewed from a direction of the collimated incident light rays. Therefore, were the apertures 624 to be mirrors, the reflected light would be wasted. In the present case, the presence of the apertures 624 therefore removes otherwise unnecessary mass from the assembly.

Each aperture 624 therefore has a radius $$\frac{R}{\sqrt{10}},$$

where is the radius of each aperture's 624 respective mirror 608, 610, which corresponds to the central 10% of the surface of the solar collector 604. Due to the lack of photovoltaic cells on this portion of the depicted solar collector 604, these apertures 624 are provided both to reduce mass and to prevent unnecessary heating of the structure of the solar collector 604. Of course, were a different design of solar collector 604 to be used in the assembly 600, the apertures 624 may be removed or adapted to correspond to the specific design of solar collector 604. For example, a smaller area lacking in photovoltaic cells could be provided and the apertures 624 made correspondingly smaller.

The shape of the concave mirror 608 and concave mirror 610 is configured such that the output of the convex mirror 610 matches the input of the solar collector 604. In order to match output without having an unnecessarily large mass for the assembly, the concave mirror 608 is configured such that all the light reflected from the concave mirror 608 is directed towards the convex mirror 610. To achieve this, both the concave mirror 608 and the convex mirror 610 have a substantially elliptical shape, with differing sizes. These shapes match up with the substantially circular cross-section of the collector such that all light incident on the concave mirror 608 falls on the collector 604 after concentration.

Although described in this embodiment as ovoid mirrors and a circular collector, the mirrors and collector may of course have any shape. In order to minimise mass, however, the shape of the mirrors and collector will be chosen such that the majority of the light reflected from the convex mirror is incident upon the collector, and that the majority of the light incident on the concave mirror is incident upon the convex mirror. Preferably, both of these criteria will be fulfilled.

An advantage of single-plane concentration is that the relative positioning of the concave mirror 508, 608 and convex mirror 510, 610 can be minimised. For example, comparing the assembly of FIG. 10 to the assembly of FIG. 3, it can be seen that the solar concentrator assembly 602 is much closer to the rotational axis of the solar collector 604 in FIG. 10. When positioned in space and subject to solar radiation pressure, this alignment helps to minimise the torque exerted on the assembly 600 due to this solar radiation pressure.

The solar collector assembly 600 shown in FIG. 10 includes two solar concentrator assemblies 602, one on each side of the solar collector 604. Each solar concentrator assembly 602 provides ×2 concentration, for a total of ×4 insolation on the solar collector 604. Of course, other concentrations are possible, and may only be limited by thermal considerations.

An additional advantage of having collimated light incident upon the solar collector, as is provided by each embodiment herein, is that it is possible to use high concentration photovoltaics, such that local concentration can be provided in the region of up to ×625—for high photovoltaic efficiency. In contrast, alternative solutions that do not produce a collimated output are restricted by requiring a high acceptance angle for each photovoltaic cell.

Where the use of features is not mutually-exclusive, any feature of the first embodiment may be used with any feature of the second embodiment, and combinations of features may be used to produce additional embodiments. For example, whilst a power-beaming transmitter is not shown in relation to the embodiment of FIG. 3, it may be used if required. The power-beaming transmitter could be amalgamated with the solar collector. In addition, support structures may take any form that locates and orientates the components of the assemblies, the potential options being well-known to those skilled in the art.

Although described as a solar concentrator assembly and a solar collector assembly, the present invention is equally applicable to any other type of assembly that is required to concentrate incident radiation whilst maintaining collimation.

The invention claimed is:

1. A solar concentrator assembly comprising:
   a concave mirror for collecting radiation that is collimated and has uniform distribution from a source; and
   a convex mirror;
   the concave mirror being configured to reflect said radiation to the convex mirror;
   the convex mirror being configured to reflect said radiation as a concentrated collimated beam in an emission direction that is angularly offset from the source;
   the concave mirror and the convex mirror each having a focal length that varies along one axis such that the radiation collected by the concave mirror is transmitted from the convex mirror with uniform distribution; and
   the solar concentrator assembly further comprising two sets of the concave mirrors and the convex mirrors arranged rotationally-symmetric and 180° about a direction of the source.

2. The solar concentrator assembly according to claim 1, wherein the focal lengths of the concave mirror and the convex mirror are continuously-variable along a focal line.

3. The solar concentrator assembly according to claim 1, wherein the emission direction is orientated at approximately 90° from the source.

4. The solar concentrator assembly according to claim 1, wherein the one axis of the concave mirror and the one axis of the convex mirror are co-planar.

5. The solar concentrator assembly according to claim 4, wherein the one axis of the concave mirror and the one axis of the convex mirror are co-planar with the emission direction.

6. The solar concentrator assembly according to claim 1, wherein an area of the convex mirror that reflects radiation from the concave mirror is smaller than an area of the concave mirror that reflects radiation to the convex mirror.

7. The solar concentrator assembly according to claim 1, wherein the radiation includes radiation of the visible spectrum.

8. The solar concentrator assembly according to claim 1, wherein the solar concentrator assembly is optimised to minimise a total surface area of the concave mirror and the convex mirror.

9. The solar collector assembly according to claim 1, wherein the concave mirror and the convex mirror may have missing quadrants.

10. The solar concentrator assembly according to claim 1, further comprising a support structure that limits relative movement of the concave mirror and the convex mirror.

11. The solar concentrator assembly according to claim 1, wherein the convex mirror and the concave mirror have a continuously-variable curvature about and along the one axis.

12. The solar concentrator assembly according to claim 1, wherein the concave mirror and the convex mirror are configured to cause concentration of light along parallel planes normal to other planes within which the light is redirected.

* * * * *